Nov. 24, 1964  G. U. SORGER  3,158,808
CONSTANT-GAIN VARIABLE BANDWIDTH AMPLIFIER SYSTEM
Filed April 1, 1960  4 Sheets-Sheet 1

INVENTOR
Gunther U. Sorger

BY Max. L. Libman

ATTORNEY

INVENTOR
Gunther U. Sorger

INVENTOR.
Gunther U. Sorger
BY
Max L. Libman

INVENTOR
Gunther U. Sorger
BY
Max L. Libman
atty.

3,158,808
CONSTANT-GAIN VARIABLE BANDWIDTH
AMPLIFIER SYSTEM
Gunther U. Sorger, Rockville, Md., assignor, by mesne
assignments, to Weinschel Engineering Co., Inc., Kensington, Md., a corporation of Delaware
Filed Apr. 1, 1960, Ser. No. 19,311
4 Claims. (Cl. 324—123)

This invention relates to an A.-C. amplifier system, and particularly to such a system which is useful for making accurate measurements of the strength of a received signal of relatively constant frequency, usually in the audio-frequency range.

In measuring systems, and particularly where it is necessary to make measurements over a wide dynamic range of received power with considerable accuracy, the equipment used for this purpose must often meet a number of mutually exclusive criteria. For example, the dynamic range can be increased, but only at the expense of accuracy; or the measurement can be made more rapidly if a wideband system is used, but linearity at low signal level suffers. In a practical instrument, if good linearity can be maintained over a range of 40 decibels, this is usually sufficient, although some special applications require a wider range. However, in many practical situations a smaller range might suffice, in which case certain other advantages can sometimes be realized, if the equipment is sufficiently flexible to enable this to be done.

The dynamic range is limited on the high end by the overload characteristics of the amplifier used or departure from a square law or linear characteristic of the detector. The low end is determined by the system noise through two quite different effects. First, the noise causes a fluctuation of the output indicator or recorder around its true reading, making it difficult to determine the true indication. Secondly, it causes an increase in the average indicator reading when an average detector is used. The first effect can be counteracted by the use of indicators having long time constants. In theory, at least, this can be carried to any extreme to render a usable reading. Practically, however, there is no need going past the point where the second effect becomes important. Another undesired effect of a long indicator time constant is the added length of time required for a measurement. The second effect can be counteracted only by maintaining a good signal-to-noise ratio at the output detector. One way of accomplishing this is to restrict the bandwidth of the amplifier preceding the detector. A narrow bandwidth, however, has the same effect as a long indicator time constant, i.e., it increases the time required to make a measurement. Decreasing the bandwidth preceding the detector does not reduce the indicator fluctuation; this can only be done by increasing the indicator time constant.

Ease and convenience of measurement are also highly desirable factors in a practical instrument. As indicated above, the dynamic range of accuracy requirements limits the speed with which a measurement can be made in that the system bandwidth is a factor in determining the system noise. If only an occasional measurement of a variable function is desired, this can be done by taking point by point readings and plotting the data manually. However, this can be very tedious and one runs the risk of missing some of the fine structure of the function.

It is a major object of the invention to provide a measuring instrument which meets the requirements stated above to a very high degree. More specifically, it is an object of the invention to provide a measuring instrument the bandwidth of which can be varied over a sufficiently wide range to provide a reasonable compromise in a given situation between the factors mentioned above, so as to suit the particular situation, while the gain of the system remains quite constant despite the variation of bandwidth.

A further object is to provide a simple and reliable circuit having a bandwidth continuously adjustable over a range and a substantially constant gain over the same range.

The specific nature of the invention as well as other objects and advantages thereof will clearly appear from a description of a preferred embodiment as shown in the accompanying drawings, in which.

Although the invention is of general application in any situation where accurate measurements are required, it is particularly useful in taking measurements where it is required to measure a sweep or to plot a graph of received measurement values over a wide dynamic range of powers at a reasonably rapid rate. For example, if it is required to make voltage standing wave ratio measurements having a large standing wave ratio, then the maximum-to-minimum may be very large and if it is desired to do this very rapidly, then a wide bandwidth is necessary. On the other hand, if the measurements can be taken slowly, a narrower bandwidth may be more suitable.

Another application is in the measurement of antenna pattern range measurement. Such an application is described in some detail in The Microwave Journal for October 1959, in an article by Albert L. Hedrich, entitled "A New Receiver for Antenna Pattern Ranges," which describes the instrument of the present invention as employed for such a purpose. In that case the received signal is a radio frequency signal square wave modulated at 1000 cycles per second. Since this modulation frequency (1,000 c.p.s.) has become the more or less standard modulating frequency for R-F measurement purposes, the invention will be described in connection with a system operating at this frequency, although it will be apparent that any suitable frequency can be employed.

Figure 1:
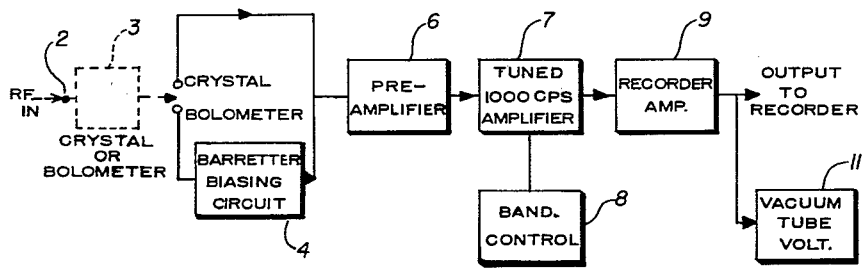
FIG. 1 is a block diagram of a system embodying the invention.

FIG. 1 is a block diagram of a typical receiver employing the principle of the present invention to measure the strength of a continuously varying R-F signal. The R-F signal input is received at point 2 and passed to a detection unit 3 which may be either a silicon crystal or a biased barretter. If a barretter is used, the signal is then passed through a barretter biasing circuit 4, which may be of any known design, and is not a part of the present invention; from this point it is passed through a pre-amplifier 6, which is preferably designed for the lowest possible noise level to provide for the maximum dynamic range. The amplified signal is now passed through a tuned 1,000 c.p.s. amplifier 7 with which is associated bandwidth control unit 8 which will be described in detail below. Units 7 and 8 provide variable bandwidth control, in a typical case furnishing any bandwidth between 2 and 15 cycles per second centered at 1,000 cycles per second with a negligible dependence of gain on bandwidth. The output is now passed to recorder amplifier 9, and thence to any suitable recorder (not shown) or to a vacuum tube voltmeter 11, or both. The vacuum tube voltmeter 11 indicates output voltage, allowing patterns to be taken point by point, and also permits the instrument to be used for making other types of insertion loss measurements.

As noted above, two types of square law detectors, crystal diodes and barretters are used in the example given. The noise contributed by the detector is important in determining the minimum signal that can be received, and the departure from a square law characteristic determines the maximum signal level. The noise resistance of a video crystal is about 15,000 ohms. The noise resistance of a barretter, on the other hand, is equal to its D.-C. resistance, which in this case is approximately 200 ohms, but since it is operated at an elevated temperature due to the D.-C. bias current, this corresponds to an equivalent noise resistance of approximately 300 ohms at room temperature. With this information and the equivalent noise of the receiver, it is possible to determine the minimum usable receiver input signal level. The radio frequency input power required to produce this signal depends, of course, on the detector sensitivity.

The other detector characteristic of importance in this connection is the overload characteristic. Neither crystal diodes nor barretters maintain their square law characteristic for large input signals, and it is important to know the limits of operation for a given error.

As mentioned earlier, the presence of noise in the system has two undesired effects: (1) It causes a fluctuation of the output indicator; and (2) It causes an increase in the average output. The increase in the average output is the more serious of the two effects, since it results in an error that is not apparent to the observer while it is possible to average out the fluctuations by an increased observation time. This is particularly easy to do when a recorder is used on the output. Calculations show that, for a 5 cycle bandwidth, to produce an r.m.s. fluctuation of no more than 20 percent requires a minimum signal-to-noise ratio of at least 8:1. Computations show that the minimum audio input voltage to maintain the desired 8:1 signal-to-noise ratio is approximately 300 millimicrovolts for a crystal square law detector. Reducing the bandwith to 2 cycles per second multiplies this voltage by the square root of ⅖, which gives a minimum input signal of 190 millimicrovolts. For the barretter, a minimum input signal of 100 millimicrovolts for a bandwidth of 5 cycles and 70 millimicrovolts for a bandwidth of 2 cycles per second are required. It can also be shown that, for a crystal, a bandwidth of 5 cycles per second will give, in a typical receiver of the type shown, a linear range of 38.3 db; and a bandwith of 2 cycles per second will give a range of 40.3 db. The dynamic range is in terms of R-F power levels at the input to a square law detector. It will be furhter noted that the R-F required to produce the required 2 millivolts at the receiver is quite dependent upon (R-F) frequency. In order to realize the full dynamic range of the detector, an R-F attenuator is required between the R-F signal source and the detector.

Figure 2:
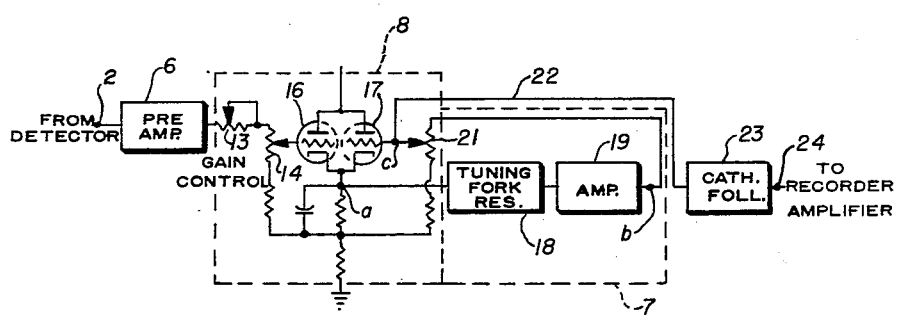
FIG. 2 is a more detailed block diagram illustrating the relationship of the component elements of the invention.

FIG. 2 shows a block diagram of tuned amplifier 7 and bandwidth control 8 of FIG. 1, respectively. The input to the unit is made through a preamplifier 6 and gain controls 13 and 14 to the cathode of tube 16. Vacuum tubes 16 and 17 are connected together as a cathode coupled mixer and amplifier. They serve the purpose of injecting the feedback voltage into the system, as will be shown below, and providing a low impedance source from which to drive the tuning fork resonator 18. This resonator has a working Q of about 10,000 which would yield a bandwidth of 0.1 cycle at a center frequency of 1 kilocycle per second. However, by feeding the output of amplifier 19 back through potentiometer 21 to the grid tube 17 as a controllable negative feedback loop, and taking the output from the slider of the potentiometer 21, on line 22, the bandwidth can be varied, as will be shown below. Potentiometer 21 is made as smooth as possible, e.g., by using a slide wire potentiometer or one having many very small steps to provide a substantially smooth output as the slider is moved.

The usual negative feedback arrangement provides feedback between the output and input of the amplifier, as is well known. It is known that applying negative feedback around a tuned circuit has the effect of reducing the effective Q of the circuit. Conversely, applying positive feedback around a circuit tends to increase the Q, so that if the positive feedback is adjusted until the circuit is just below the point of oscillation, the gain goes up tremendously, and the Q is increased correspondingly. Under these conditions, a circuit has a very narrow bandwidth. In the present case, the application of negative feedback as shown has the opposite effect of reducing the Q. In the present example, the Q of 10,000 is narrower than is desired, and also the tuning fork itself is not linear, so that the application of negative feedback also has the desirable effect of decreasing the non-linearity of the tuning fork. However, applying negative feedback in the conventional fashion would at the same time change the gain by a factor that would be inversely proportional to the amount of feedback employed, if the feedback were larger than 1, as is normally the case. The arrangement shown in FIG. 2 differs from the conventional negative feedback circuit in that the output is taken from point $c$, where the voltage is proportional to the amount of feedback. In the present case, the feedback is large, typically by an amplification factor in the order of from 20 to 150. Since the feedback is large, in the circuit shown, the gain is substantially proportional to the feedback (in the opposite sense), and the output voltage can be held constant. This can be shown from the following analysis:

Considering the voltages $E_a$, $E_b$, and $E_c$ to exist at points $a$, $b$, and $c$, respectively, the gain from point $a$ to point $b$ is given by $$A_{a,b} = \frac{A}{1+A\beta}$$

where:

$A$ = gain from $a$ to $b$ without feedback
$\beta$ = fraction of signal fed back from $b$ to $a = K\, E_c/E_b$
$K$ = constant
$A_{a,b}$ = gain from $a$ to $b$ with feedback.

The output is taken from point $c$ so that $$A_{a,c} = \frac{A}{1+A\beta} \cdot \frac{E_c}{E_b} = \frac{A}{1+A\beta} \cdot \frac{\beta}{K}$$

If $A\beta$ is large compared to 1 (e.g., at least 5), as it is in the present case, then:

$$A_{a,c} = \frac{1}{\beta} \cdot \frac{\beta}{K} = \frac{1}{K}$$

and it is apparent that the gain between points $a$ and $c$ is substantially independent of feedback. In effect, the output voltage is taken from a point where the factor $\beta$ also appears in the numerator so that it is cancelled out in the above formula. In practice, with the above circuit, it is possible to guarantee that the gain will vary no more than 10% for variations in bandwidth between 2 and 15 cycles per second and by no more than 5% for bandwidth variations between 3 and 15 cycles per second.

Figure 3A:
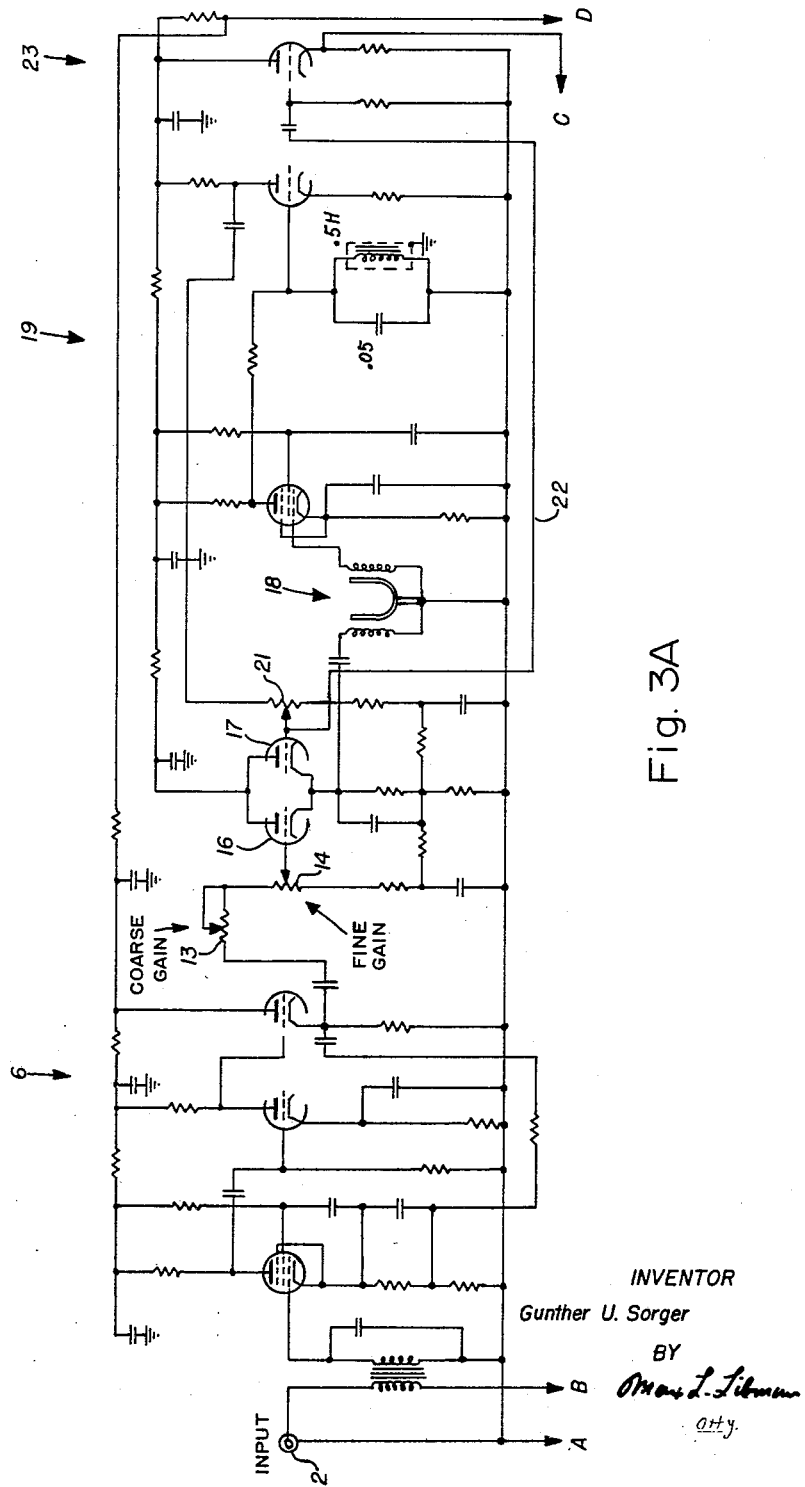
FIG. 3 is a detailed schematic circuit diagram of a complete practical circuit embodying the invention.
Figure 3B:
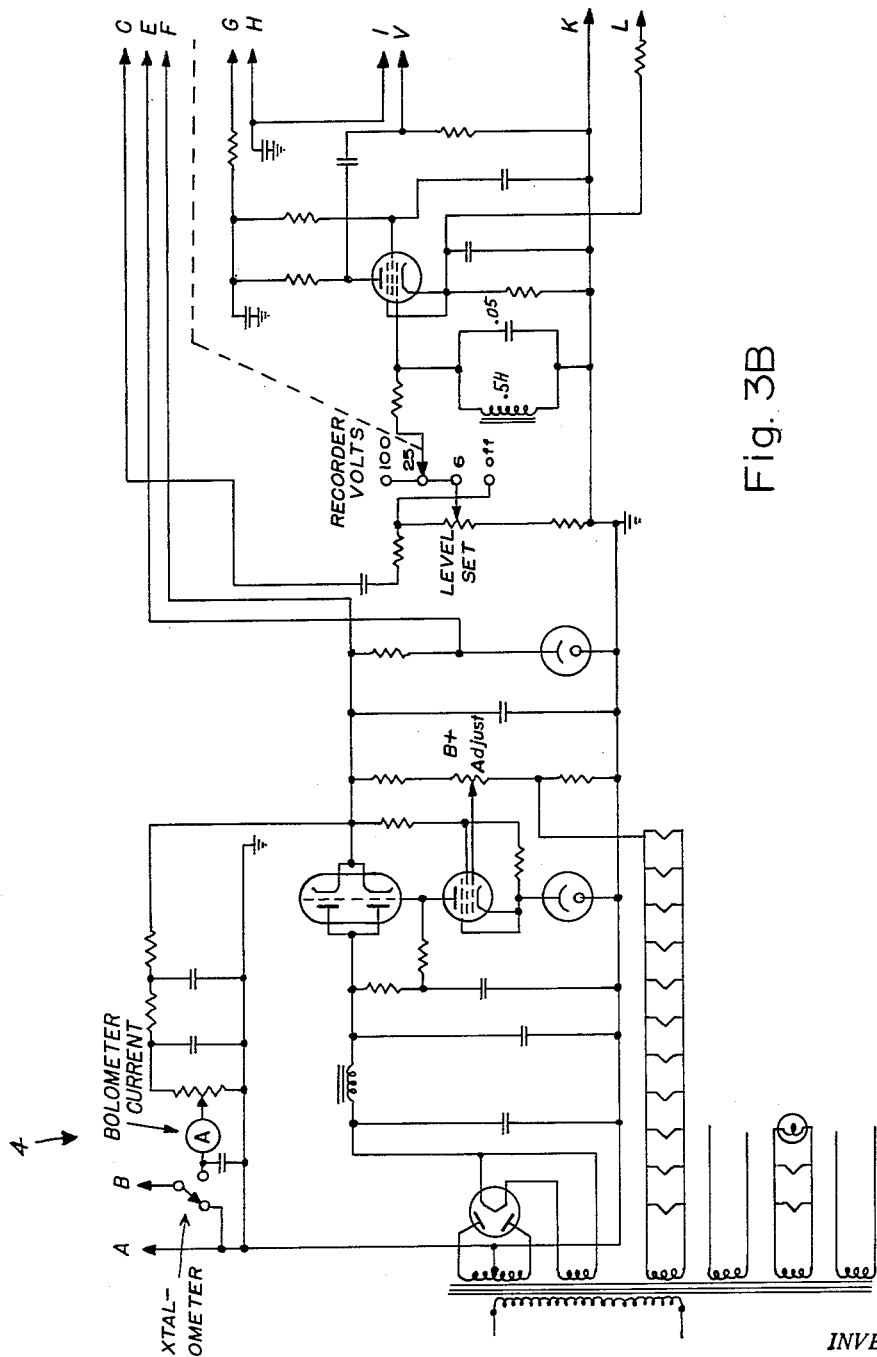
Figure 3C:
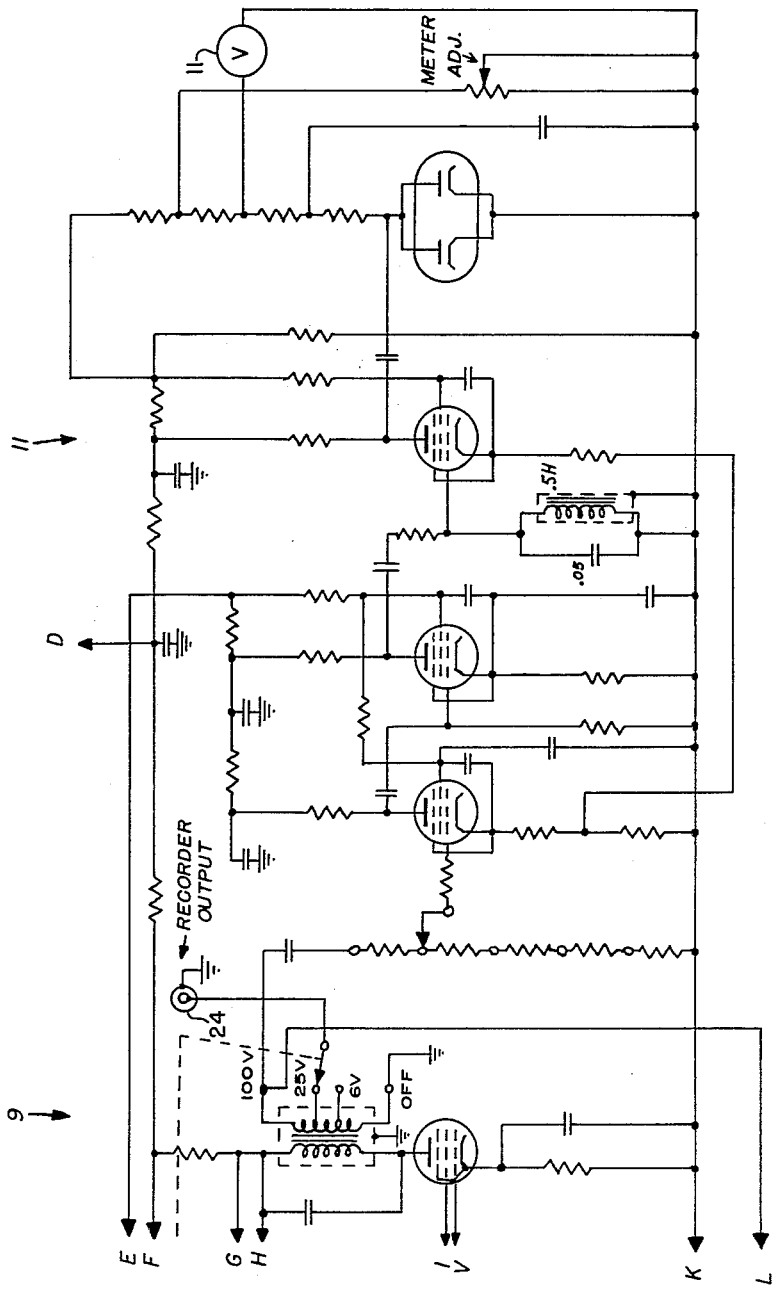

FIG. 3 is a schematic circuit diagram of a practical circuit embodying the invention. Since this is given by way of example only, and the circuit details are not a part of the present invention, it will suffice to indicate the corresponding elements to those shown in FIG. 2 by the use of the same reference numerals. It will be apparent that the actual circuit details can vary widely from one application of the invention to another, and can be varied widely within the skill of the electrical circuit designer.

It will be apparent that the embodiments shown are only exemplary and that various modifications can be made in construction and arrangement within the scope of my invention as defined in the appended claims.

I claim:

1. A constant-gain variable bandwidth system for measuring a received electrical signal of a definite R-F frequency modulated by a definite A-F frequency signal comprising square-law detector means for demodulating said signal and producing a signal output at said audio frequency which is a function of the received signal strength; a differential amplifier and mixing circuit having two input circuit terminal means and an output circuit terminal means, said audio signal output being supplied to one of said input signal terminal means; a normally narrow-band tuned amplifier circuit tuned to said audio frequency, and having its input connected to said output circuit terminal means and its output connected through adjustable impedance means to the other of said input signal terminal means as a negative feedback circuit; said adjustable impedance means including variable control means in said feedback circuit for supplying a controllable portion of said negative feedback to the other of said input circuit terminal means of said mixing circuit, said portion being at least five times larger than the input to the tuned amplifier; an output terminal connected to said other input circuit terminal means to provide a function of the signal strength at that point as the output of the system; and measuring means connected to said output terminal, whereby said variable control means controls the bandwidth of the output at a substantially constant gain.

2. The invention according to claim 1, said tuned amplifier including a high-Q mechanical resonator.

3. The invention according to claim 2, and gain control means in said one input terminal circuit of said mixing circuit for initially setting the gain factor of the system.

4. A constant-gain variable bandwidth system for use in measuring a received electrical signal of a predetermined frequency, comprising a differential amplifier and mixing circuit having two input circuit terminals and an output circuit terminal; said received signal being supplied to one of said input terminals; a normally narrow-band tuned amplifier circuit tuned to said predetermined frequency, and having its input connected to said mixer circuit output terminal, and its output connected as a negative feedback circuit through a variable control element for supplying a controllable portion of the feedback signal to the other of said two input circuit terminals of said mixing circuit; an output signal terminal connected to said other mixer input circuit terminal to provide an output signal having a substantially constant amplitude relationship to said received signal supplied to the mixer input terminal, whereby said variable control element controls the bandwidth of the output, said controllable portion of the feedback signal being at least five times greater than the signal supplied to the feedback circuit, and measuring means connected to the system output.

References Cited by the Examiner
UNITED STATES PATENTS

| 2,673,255 | 3/54 | Watkinson | 330—108 |
| 2,912,580 | 11/59 | Hurford | 330—70 |
| 2,935,688 | 5/60 | Croly | 330—69 |

FOREIGN PATENTS 323,823  7/29  Great Britain.

WALTER L. CARLSON, *Primary Examiner.*

ELI J. SAX, BENNETT G. MILLER, *Examiners.*